United States Patent
Kuo

(10) Patent No.: US 8,965,154 B2
(45) Date of Patent: Feb. 24, 2015

(54) OPTICAL COUPLING LENS

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/974,152

(22) Filed: Aug. 23, 2013

(65) Prior Publication Data

US 2014/0199024 A1 Jul. 17, 2014

(30) Foreign Application Priority Data

Jan. 14, 2013 (TW) ................. 102101261 A

(51) Int. Cl.
    *G02B 6/32* (2006.01)
(52) U.S. Cl.
    CPC .......................... *G02B 6/32* (2013.01)
    USPC ............................... 385/33; 385/41
(58) Field of Classification Search
    USPC .......................... 385/33–37, 41–43
    See application file for complete search history.

(56) References Cited

U.S. PATENT DOCUMENTS

| 4,636,626 A * | 1/1987 | Hazama et al. ............ 250/201.4 |
| 4,790,632 A * | 12/1988 | Miyakawa et al. ............ 349/95 |
| 5,223,693 A * | 6/1993 | Zumoto et al. ........... 219/121.68 |
| 2008/0239266 A1 * | 10/2008 | Noboru .......................... 355/53 |
| 2012/0176590 A1 * | 7/2012 | Noboru .......................... 355/67 |

\* cited by examiner

*Primary Examiner* — Akm Enayet Ullah
(74) *Attorney, Agent, or Firm* — Novak Druce Connolly Bove + Quigg LLP

(57) ABSTRACT

An optical coupling lens includes a body, first converging portions, second converging portions, third converging portions, and fourth converging portions. The body includes a first optical surface, a second optical surface perpendicular to the first optical surface, and a reflecting surface oblique relative to the first optical surface and the second optical surface. The first and second converging portions are formed on the first optical surface and face the reflecting surface. The third and fourth converging portions are formed on the second optical surface and face the reflecting surface. The third converging portions correspond to the first converging portions, and the fourth converging portions correspond to the second converging portions. The reflecting surface is configured for reflecting light beams from the first converging portions toward the corresponding third converging portions, and for reflecting light beams from the fourth converging portions toward the corresponding second converging portions.

9 Claims, 3 Drawing Sheets

OPTICAL COUPLING LENS

BACKGROUND

1. Technical Field

The present disclosure relates to communication technologies, and particularly to an optical coupling lens.

2. Description of Related Art

An optical fiber coupling connector is used in fiber-optic data transmission. The optical fiber coupling connector includes a number of light-emitting modules, a number of light receiving modules, and a number of light optical fibers. The light-emitting modules and the light-receiving modules are linearly aligned with and optically coupled with the respective optical fibers. However, the linear alignment takes up a lot of space.

Therefore, it is desirable to provide an optical coupling lens, which can overcome at least alleviate the above-mentioned problems.

DETAILED DESCRIPTION

Figure 1:
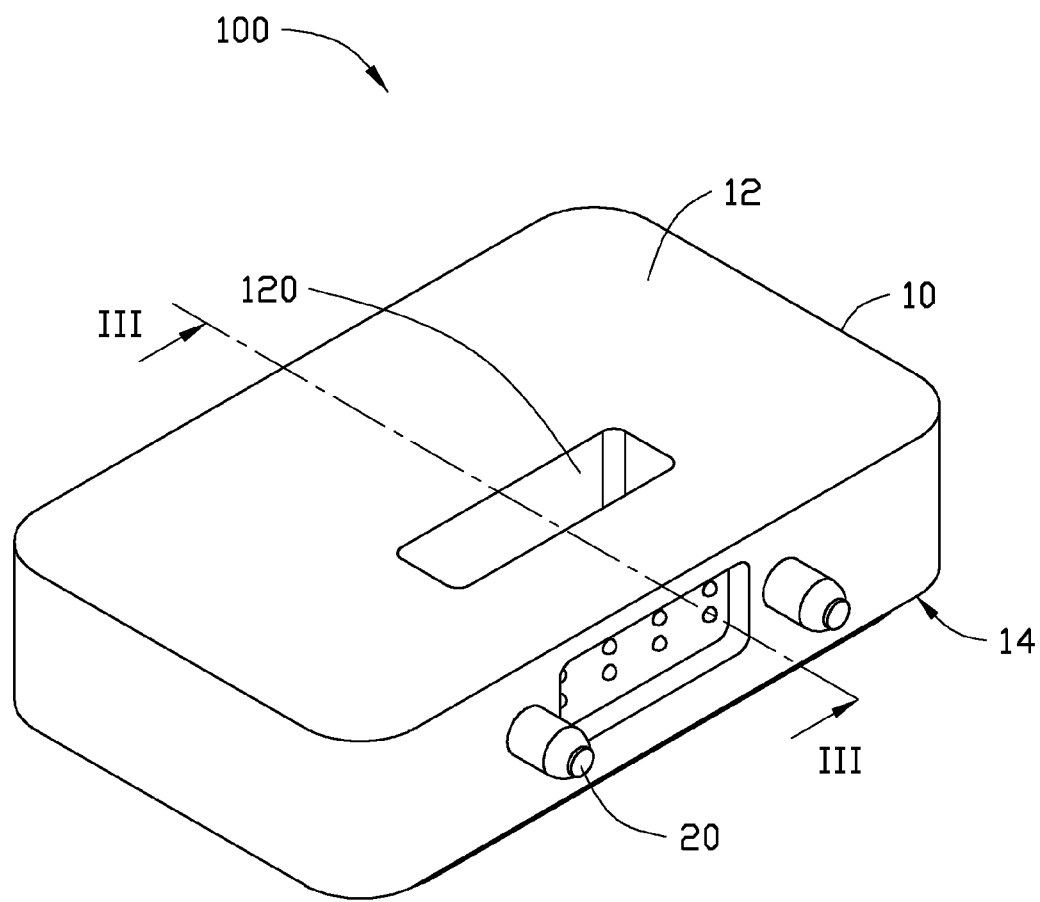
FIG. 1 is a schematic, isometric view of an optical coupling lens, according to an exemplary embodiment.
Figure 2:
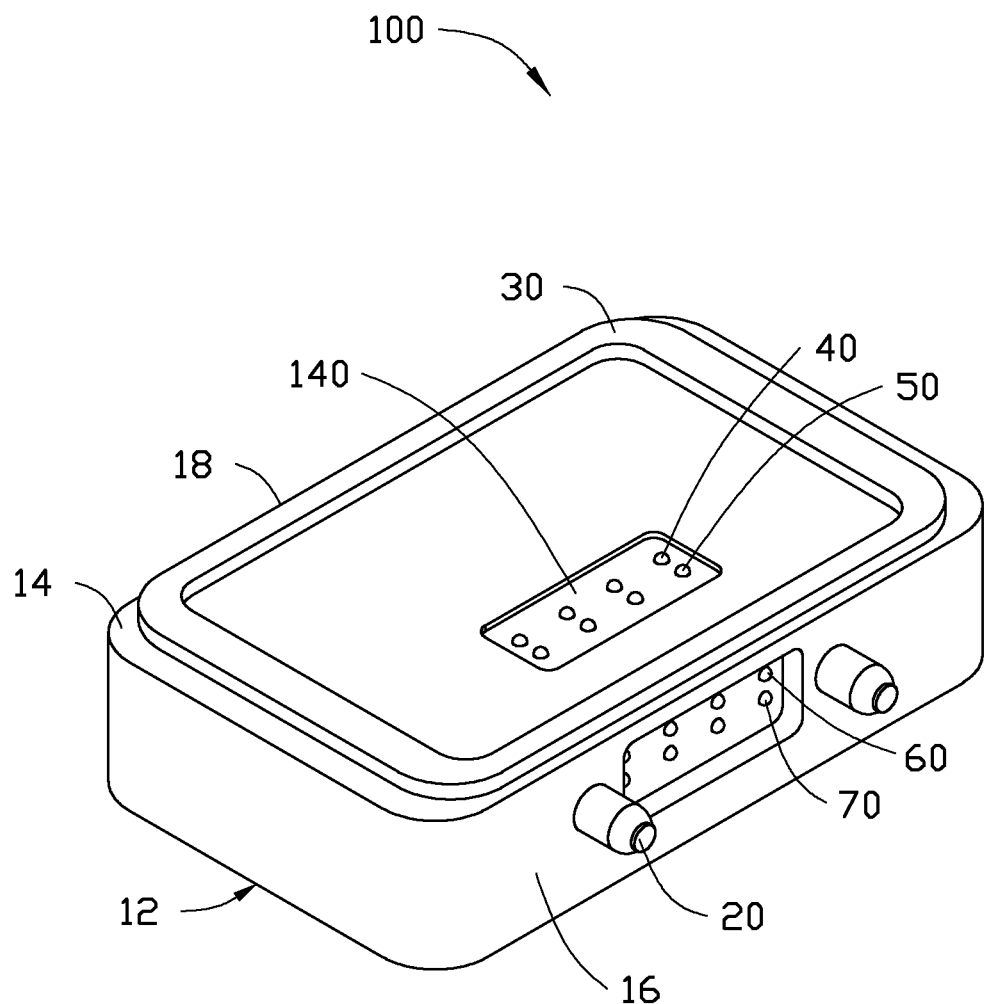
FIG. 2 is similar to FIG. 1, but viewed from another angle.

FIGS. 1-2 shows an optical coupling lens 100 according to an exemplary embodiment. The optical coupling lens 100 includes a body 10, two locating posts 20, a support 30, four first converging portions 40, four second converging portions 50, four third converging lenses 60, and four fourth converging lenses 70.

The body 10 is substantially cuboid. The body 10 includes a top surface 12, a bottom surface 14, a front surface 16, and a back surface 18. The top surface 12 and the bottom surface 14 are positioned at opposite sides of the body 10, and the top surface 12 is substantially parallel to the bottom surface 14. The front surface 16 and the back surface 18 are positioned at opposite sides of the body 10, and the front surface 16 is parallel to the back surface 18. The front surface 16 and the back surface 18 are substantially perpendicularly interconnected between the top surface 12 and the bottom surface 14.

Figure 3:
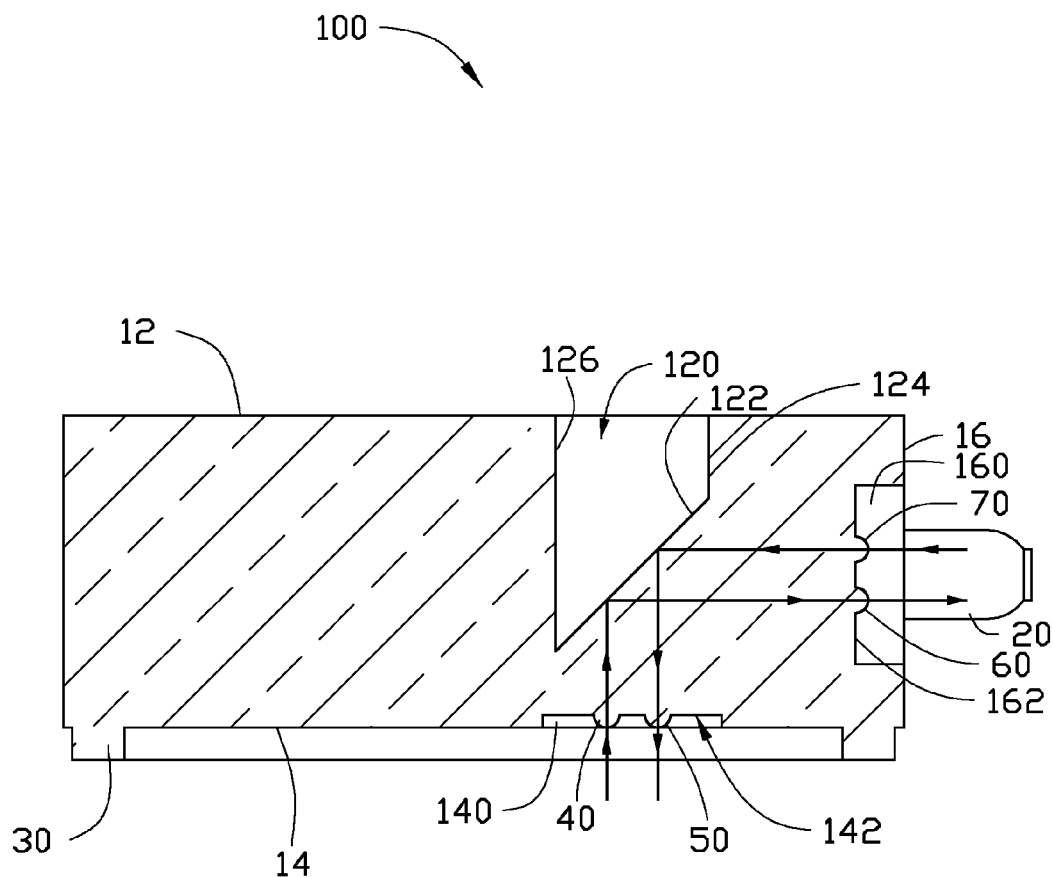
FIG. 3 is a cross-sectional view of the optical coupling lens of FIG. 1, taken along the line of FIG. 1.

FIGS. 2-3 show that the top surface 12 defines an elongated top recess 120. The body 10 further includes a reflecting surface 122, a first side surface 124, and a second side surface 126 in the top recess 120. The reflecting surface 122 is positioned at the bottom of the top recess 120 and is inclined relative to the top surface 12. The first side surface 124 connects the reflecting surface 122 to the top surface 12. The second side surface 126 connects the reflecting surface 122 to the top surface 12. The first side surface 124 is substantially parallel to and opposite to the second side surface 126. The first side surface 124 and the second surface 126 are substantially perpendicular to the top surface 12. In this embodiment, an included angle between a main plane of the reflecting surface 122 and a main plane of the top surface 12 is about 45 degrees.

The bottom surface 14 defines a rectangular bottom recess 140. The body 10 further includes a first optical surface 142 in the bottom recess 140. The first optical surface 142 is positioned at the bottom of the bottom recess 140 and is parallel to the bottom surface 14. That is, an included angle between a main plane of the first optical surface 142 and a main plane of the reflecting surface 122 is about 45 degrees.

The front surface 16 defines a rectangular front recess 160. The body 10 further includes a second optical surface 162 in the front recess 160. The second optical surface 162 is positioned at the bottom of the front recess 160 and is parallel to the front surface 16. That is, an included angle between a main plane of the second optical surface 162 and a main plane of the reflecting surface 122 is about 45 degrees.

The two locating posts 20 extends substantially perpendicularly from the front surface 16 and are configured to engage in respective holes (not show) of other elements (not shown), when the other elements are assembled with the optical coupling lens 100. The two locating posts 20 sandwich the front recess 160. That is, the front recess 160 is located between the two locating posts 20, and the front recess 160 and the two locating posts 20 are arranged collinearly.

The support 30 is a rectangular ring. The support 30 perpendicularly depends from the bottom surface 14. The support 30 extends along four edges of the bottom recess 140 and surrounds the bottom recess 140. The support 30 is adhered on a circuit board (not shown) with an adhesive agent when the optical coupling lens 100 is assembled with the circuit board.

The four first converging portions 40 and the four second converging portions 50 are formed on the first optical surface 142 and face the reflecting surface 122. The four first converging portions 40 are spaced from each other and are arranged in a first straight line which is substantially parallel to the reflecting surface 122. The four second converging portions 50 are spaced from each other and are arranged in a second straight line which is substantially parallel to the reflecting surface 122. When the optical coupling lens 100 is in use, the four first converging portions 40 are aligned with four light-emitting modules (not shown), and the four second converging portions 50 are aligned with four light-receiving modules (not shown). In this embodiment, each of the first converging portions 40 and the second converging portions 50 is a convex lenses.

The four third converging portions 60 and the four fourth converging portions 70 are formed on the second optical surface 162 and face the reflecting surface 122. The four third converging portions 60 are spaced from each other and are arranged in a third straight line which is substantially parallel to the reflecting surface 122. The four fourth converging portions 70 are spaced from each other and are arranged in a fourth straight line which is substantially parallel to the reflecting surface 122. That is, the first straight line, the second straight line, the third straight line, and the fourth straight line are substantially parallel to each other. The third converging portions 60 correspond to the first converging portions 40, and the fourth converging portions 70 correspond to the second converging portions 50. When the optical coupling lens 100 is in use, the four third converging portions 60 and the four fourth converging portions 70 are aligned with optical fibers (not shown). In this embodiment, each of the third converging portions 60 and the fourth converging portions 70 is a convex lenses.

In this embodiment, the optical coupling lens 100 is a single piece. That is, the body 10, the two locating posts 20, the support 30, the four first converging portions 40, the four second converging portions 50, the four third converging portions 60, and the four fourth converging portions 70 are formed into a unitary piece.

FIG. 3 shows that when the optical coupling lens 100 is in use, light beams emitting from the light-emitting modules pass through the first converging portions 40 and become parallel light beams. The parallel light beams are reflected by the reflecting surface 122 toward the corresponding third converging portions 60, and are converged by the corresponding third converging portions 60 to the corresponding optical fibers. Accordingly, light beams from the optical fibers pass through the fourth converging portions 70 and become parallel light beams. The parallel light beams are reflected by the reflecting surface 122 toward the corresponding second converging portions 50, and are converged by the corresponding second converging portions 50 to the corresponding light-receiving modules.

During the above-described process, the light path between the optical fibers and the light-receiving modules and the light path between the light-emitting modules and the optical fibers are changed about 90 degrees by the optical coupling lens 100. In addition, the first converging portions 40 correspond to the third converging portions 60, and the second converging portions 50 correspond to the fourth converging portions 70, thereby increasing the amount of the optical transmission passages and accordingly increasing optical transmission efficiency.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An optical coupling lens comprising:
   a body comprising a first optical surface, a second optical surface perpendicular to the first optical surface, and a reflecting surface oblique relative to the first optical surface and the second optical surface;
   a plurality of first converging portions formed on the first optical surface and facing the reflecting surface;
   a plurality of second converging portions formed on the first optical surface and facing the reflecting surface;
   a plurality of third converging portions formed on the second optical surface and facing the reflecting surface, the third converging portions corresponding to the first converging portions; and
   a plurality of fourth converging portions formed on the second optical surface and facing the reflecting surface, the fourth converging portions corresponding to the second converging portions, the reflecting surface configured for reflecting light beams from the first converging portions toward the corresponding third converging portions, and for reflecting light beams from the fourth converging portions toward the corresponding second converging portions.

2. The optical coupling lens as claimed in claim 1, wherein the first converging portions are apart from each other and are arranged in a first straight line which is substantially parallel to the reflecting surface, and the second converging portions are apart from each other and are arranged in a second straight line which is substantially parallel to the reflecting surface.

3. The optical coupling lens as claimed in claim 2, wherein the third converging portions are apart from each other and are arranged in a third straight line which is substantially parallel to the reflecting surface, and the fourth converging portions are apart from each other and are arranged in a fourth straight line which is substantially parallel to the reflecting surface.

4. The optical coupling lens as claimed in claim 3, wherein the body further comprises a top surface, a bottom surface opposite to and parallel to the top surface, a front surface, and a back surface opposite to and parallel to the front surface, the front surface and the back surface are interconnected between the top surface and the bottom surface, the top surface defines a top recess, the reflecting surface is positioned at the bottom of the top recess, the bottom surface defines a bottom recess, the first optical surface is positioned at the bottom of the bottom recess, the front surface defines a front recess, and the second optical surface is positioned at the bottom of the front recess substantially parallel to the front surface.

5. The optical coupling lens as claimed in claim 4, wherein an included angle between a main plane of the first optical surface and a main plane of the reflecting surface is about 45 degrees, and an included angle between a main plane of the second optical surface and a main plane of the reflecting surface is about 45 degrees.

6. The optical coupling lens as claimed in claim 5, wherein the body further comprises a first side surface and a second side surface in the top recess, the first side surface is opposite to the second side surface, the first side surface is perpendicularly connected to the top surface, the second side surface is perpendicularly connected to the top surface, and the reflecting surface is obliquely interconnected between the first side surface and the second side surface.

7. The optical coupling lens as claimed in claim 5, further comprising two locating posts extending from the front surface, wherein the front recess is located between the two locating posts.

8. The optical coupling lens as claimed in claim 5, further comprising a support depending from the bottom surface and surrounding the bottom recess.

9. The optical coupling lens as claimed in claim 1, wherein each of the first converging portions, the second converging portions, the third converging portions, and the fourth converging lenses is a convex lens.

* * * * *